US010512216B2

(12) United States Patent
Ueda et al.

(10) Patent No.: US 10,512,216 B2
(45) Date of Patent: Dec. 24, 2019

(54) COMBINE HARVESTER WITH GRAIN CULM SENSOR (71) Applicant: Kubota Corporation, Osaka-shi (JP)

(72) Inventors: Mao Ueda, Sakai (JP); Kazuhiro Takahara, Sakai (JP); Katsuhide Kato, Sakai (JP)

(73) Assignee: Kubota Corporation, Osaka (JP)

( * ) Notice: Subject to any disclaimer, the term of this patent is extended or adjusted under 35 U.S.C. 154(b) by 94 days.

(21) Appl. No.: 15/578,813

(22) PCT Filed: Jun. 7, 2016

(86) PCT No.: PCT/JP2016/066816
§ 371 (c)(1),
(2) Date: Dec. 1, 2017

(87) PCT Pub. No.: WO2017/038184
PCT Pub. Date: Mar. 9, 2017

(65) Prior Publication Data
US 2018/0168100 A1 Jun. 21, 2018

(30) Foreign Application Priority Data

Sep. 2, 2015 (JP) .................. 2015-173106

(51) Int. Cl.
A01D 41/127 (2006.01)
A01D 61/00 (2006.01)
A01D 57/12 (2006.01)

(52) U.S. Cl.
CPC ......... A01D 41/127 (2013.01); A01D 61/004 (2013.01); A01D 61/008 (2013.01); A01D 57/12 (2013.01)

(58) Field of Classification Search
CPC .............. A01D 41/127; A01D 41/1271; A01D 34/006; A01D 41/06; A01D 61/004;
(Continued)

(56) References Cited

U.S. PATENT DOCUMENTS 4,166,349 A * 9/1979 Coenenberg ....... A01D 41/1278
56/10.2 F
5,299,413 A * 4/1994 Gale ..................... A01D 41/06
56/10.2 E
(Continued)

FOREIGN PATENT DOCUMENTS

JP 56104324 U1 8/1981
JP 63254920 A 10/1988
(Continued)

Primary Examiner — Arpad Fabian-Kovacs
(74) Attorney, Agent, or Firm — The Webb Law Firm (57) ABSTRACT The combine harvester includes a harvest frame that receives grain culms cut by a reaping device and a rake-in auger disposed within the harvest frame so as to be rotatable about a rotary axis extending in a right/left direction of the harvester body. The rake-in auger conveys the grain culms inside the harvest frame in a right/left direction of the harvester body and rakes in the grain culms toward the rear of the harvester body. The combine harvester further includes a feeder that is communicatively connected to a rear wall of the harvest frame, and that conveys the grain culms raked in by the rake-in auger toward the rear of the harvester body. A grain culm sensor that detects the presence of the grain culms when coming in contact with the grain culms is disposed at a grain culm feed port in the feeder.

5 Claims, 6 Drawing Sheets (58) Field of Classification Search
CPC ...... A01D 61/008; A01D 61/00; A01D 41/12; A01D 57/12; G05B 2219/45017
See application file for complete search history.

(56) References Cited

U.S. PATENT DOCUMENTS

| | | | |
|---|---|---|---|
| 6,121,782 A | 9/2000 | Adams et al. | |
| 6,591,145 B1* | 7/2003 | Hoskinson | A01D 41/127 460/1 |
| 6,863,604 B2* | 3/2005 | Behnke | A01D 41/127 460/6 |
| 7,343,262 B2* | 3/2008 | Baumgarten | A01D 41/1276 701/50 |
| 8,019,517 B2* | 9/2011 | Boenig | A01D 43/085 460/1 |
| 9,002,594 B2* | 4/2015 | Wilken | G05B 11/06 701/50 |
| 2003/0004630 A1* | 1/2003 | Beck | A01D 41/127 701/50 |
| 2003/0014171 A1* | 1/2003 | Ma | A01D 41/127 701/50 |
| 2003/0110748 A1* | 6/2003 | Coers | A01D 41/127 56/10.2 G |
| 2003/0216158 A1* | 11/2003 | Bischoff | A01D 41/127 460/6 |
| 2004/0259610 A1* | 12/2004 | Behnke | A01D 41/127 460/59 |
| 2006/0009269 A1* | 1/2006 | Hoskinson | A01D 41/1271 460/2 |
| 2006/0123757 A1* | 6/2006 | Baumgarten | A01D 41/127 56/10.2 R |
| 2009/0088932 A1* | 4/2009 | Diekhans | A01D 41/127 701/50 |
| 2009/0126327 A1* | 5/2009 | Bussmann | A01D 41/127 56/10.2 A |
| 2010/0217481 A1* | 8/2010 | Baumgarten | A01D 41/127 701/33.4 |
| 2012/0004813 A1* | 1/2012 | Baumgarten | A01D 41/127 701/50 |
| 2015/0245560 A1* | 9/2015 | Middelberg | A01D 41/1277 460/7 |
| 2017/0086365 A1* | 3/2017 | Gonzalez-Mohino | A01D 34/003 |
| 2018/0199508 A1* | 7/2018 | Mueller | A01D 41/141 |

FOREIGN PATENT DOCUMENTS

| | | | | |
|---|---|---|---|---|
| JP | 159736 U | | 4/1989 | |
| JP | 02053415 A | * | 2/1990 | ............ A01D 34/28 |
| JP | 08308365 A | * | 11/1996 | ............ A01F 12/00 |
| JP | 09322630 A | * | 12/1997 | ............ A01D 61/00 |
| JP | 10215646 A | | 8/1998 | |
| JP | 11220929 A | * | 8/1999 | ............ A01D 61/00 |
| JP | 200060274 A | | 2/2000 | |
| JP | 2002360036 A | | 12/2002 | |
| JP | 2006014666 A | * | 1/2006 | ............ A01D 67/00 |
| JP | 2018102165 A | * | 7/2018 | ............ A01D 34/24 |

* cited by examiner

COMBINE HARVESTER WITH GRAIN CULM SENSOR

CROSS-REFERENCE TO RELATED APPLICATIONS

This application is the United States national phase of International Application No. PCT/JP2016/066816 filed Jun. 7, 2016, and claims priority to Japanese Patent Application No. 2015-173106 filed Sep. 2, 2015, the disclosures of which are hereby incorporated in their entirety by reference.

TECHNICAL FIELD

The present invention is directed to a combine harvester comprising: a reaping device that cuts grain culms that are in an agricultural field; a harvest frame that receives the grain culms cut by the reaping device; a rake-in auger that is disposed within the harvest frame to be rotatable about a rotary axis extending in a right/left direction of a harvester body, the rake-in auger conveying the grain culms inside the harvest frame in the right/left direction of the harvester body to rake in the grain culms toward a rear of the harvester body; and a feeder that is communicatively connected to a rear wall of the harvest frame for conveying the grain culms raked in by the rake-in auger toward the rear of the harvester body.

BACKGROUND ART

As a combine harvester such as described above, the combine harvester described in Patent Literature 1, for example, is already known. The combine harvester described in Patent Literature 1 includes a reaping device ("mowing blade" in Patent Literature 1) that cuts grain culms in an agricultural field, a harvest frame that receives grain culms cut by a reaping device, a rake-in auger ("auger" in Patent Literature 1) that is disposed within the harvest frame so as to be rotatable about a rotary axis extending in the right/left direction of the harvester body, and that conveys the grain culms inside the harvest frame in a right/left direction of the harvester body and rakes in the grain culms toward the rear of the harvester body, and a feeder ("conveyor" in Patent Literature 1) that is communicatively connected to a rear wall of the harvest frame and that conveys the grain culms raked in by the rake-in auger toward the rear of the harvester body. This combine harvester includes a grain culm sensor that detects the presence of grain culms when coming in contact with the grain culms, on the front edge on the inner surface of the ceiling cover of the threshing chamber. The grain culm sensor is thereby able to detect whether the combine harvester is in a reaping state in which the grain culms are provided into the threshing chamber or is in a non-reaping state.

PRIOR ART DOCUMENT

Patent Literature

Patent Literature 1: JP H10-215646A

SUMMARY OF THE INVENTION

Problem to be Solved by the Invention

With regard to the combine harvester described in Patent Literature 1, the grain culms supplied into the threshing chamber are diffused by the rotation of the threshing drum and the like in the threshing chamber. Therefore, the grain culms sometimes fail to contact the grain culm sensor, and there is room for improving the detection precision of the grain culm sensor.

In view of the above circumstances, there is a need for a combine harvester which may enhance the detection precision of a grain culm sensor by reliably bringing grain culms into contact with the grain culm sensor.

Solution to the Problem

An aspect of the invention is as under:

A combine harvester comprising:

a reaping device that cuts grain culms that are in an agricultural field;

a harvest frame that receives the grain culms cut by the reaping device;

a rake-in auger that is disposed within the harvest frame to be rotatable about a rotary axis extending in a right/left direction of a harvester body, the rake-in auger conveying the grain culms inside the harvest frame in the right/left direction of the harvester body to rake in the grain culms toward a rear of the harvester body; and a feeder that is communicatively connected to a rear wall of the harvest frame for conveying the grain culms raked in by the rake-in auger toward the rear of the harvester body, and a grain culm sensor that is disposed at a grain culm feed port in the feeder for detecting a presence of the grain culms when the grain culms come into contact with the grain culm sensor.

According to the above aspect, since the grain culm sensor is disposed at the grain culm feed port toward which the mass of grain culms raked up by the rake-in auger are rushed, the grain culms are brought into contact with the grain culm sensor with enhanced possibility and the detection precision of the grain culm sensor is improved.

In addition, it is more preferable in the invention, if the feeder is disposed to be offset to one side relative to a center of the harvest frame in the right/left direction of the harvester body, and the grain culm sensor is disposed at an edge of the grain culm feed port on the other side in the right/left direction of the harvester body.

According to this characteristic configuration, the amount of the grain culms that are fed into the grain culm feed port is larger on the other side of the grain culm feed port in the right/left direction of the harvester body than that on the one side. That is, since the grain culm sensor is disposed on the edge of the grain culm feed port into which the larger amount of the grain culms is fed, the reliability with which the grain culms are brought into contact with the grain culm sensor is enhanced, and the detection precision of the grain culm sensor is improved.

In addition, it is more preferable in the invention, if the grain culm sensor is disposed at one side edge and at the other side edge of the grain culm feed port in the right/left direction of the harvester body.

According to this characteristic configuration, the grain culms fed from both the right and left sides to the grain culm feed port can be more easily brought into contact with the grain culm sensors positioned at both the right and left edges of the grain culm feed port, and the detection precision of the grain culm sensor is further improved.

Moreover, when the harvester body is caused to travel automatically, the reaping width and reaping position can be confirmed based on the detection state of the grain culm sensors on the right and left sides. For example, if the grain culm sensors on both the right and left sides detect the presence of the grain culms, it means that the grain culms are reaped along the whole width of the reaping unit, if only the grain culm sensor on the left side detects the presence of the grain culms, it means that the grain culms are reaped only on the left part of the reaping unit, and if only the grain culm sensor on the right side detects the presence of the grain culms, it means that the grain culms are reaped only on the right part of the reaping unit.

In addition, it is more preferable in the invention, if the grain culm sensor includes a claw-shaped detection member that swings when the conveyed grain culms come into contact with the grain culm sensors, to detect the presence of the grain culms, and the detection member swings along a bottom plate of the feeder.

According to this characteristic configuration, when the grain culms on the bottom plate come in contact with the detection member, the detection member swings and detects the presence of the grain culms, thus enabling an improvement of the detection precision of the grain culm sensor to be realized with a simple detection configuration.

In addition, it is more preferable in the invention, if the feeder includes a pair of front and rear rotating members rotatable about the rotary axis extending in the right/left direction of the harvester body, a pair of right and left conveyor chains that are wound around the pair of front and rear rotating members, and a plurality of conveyor guides that extend between the pair of right and left conveyor chains to engage the grain culms, the feeder is configured to convey the grain culms rearward relative to the harvester body along a lower path of the conveyor chains, and the detection member is disposed at a position between the rotary axis of the front rotating member and a bottom edge of the conveyor guide positioned on the lower path, in a height direction of the grain culm feed port.

The grain culms conveyed along the lower path tend to lift up from the bottom plate of the feeder. If the position of the detection member in the height direction of the grain culm feed port is too low, there is a risk that when the grain culms lift up, the grain culms will pass above the grain culm sensor and will fail to come in contact with the grain culm sensor. In this regard, according to this characteristic configuration, since the detection member is disposed at a somewhat high position in the height direction of the grain culm feed port, it is easier for the grain culms to come in contact with the grain culm sensor even if the grain culms lift up.

In addition, it is more preferable in the invention, if the grain culm sensor includes a main body that is supported in a cantilever manner by a side plate of the feeder and that supports the detection member, and an intrusion preventing element extends between the side plate and the rear edge of the main body to prevent intrusion of the grain culms into an behind the main body between the main body and the side plate.

If the grain culms pass under the main body and intrude into the area at the back of the main body between the main body and the side plate, there is a risk that the grain culms will become clogged in the area and the operation of the detection member will be hindered. In this regard, according to the invention, since the intrusion of the grain culms into the area at the back of the main body between the main body and the side plate can be prevented by the intrusion preventing element, such a situation can be avoided.

EMBODIMENTS OF THE INVENTION

Embodiments of the invention will be described with reference to the figures. In the description to follow, with reference to FIGS. 1 and 2, the direction of the arrow [F] indicates "the front side of the harvester body" and the direction of the arrow [B] indicates "the rear side of the harvester body"; and with reference to FIG. 2, the direction of the arrow [L] indicates "the left side of the harvester body" and the direction of the arrow R indicates "the right side of the harvester body".

[Overall Configuration of Combine Harvester]

Figure 1:
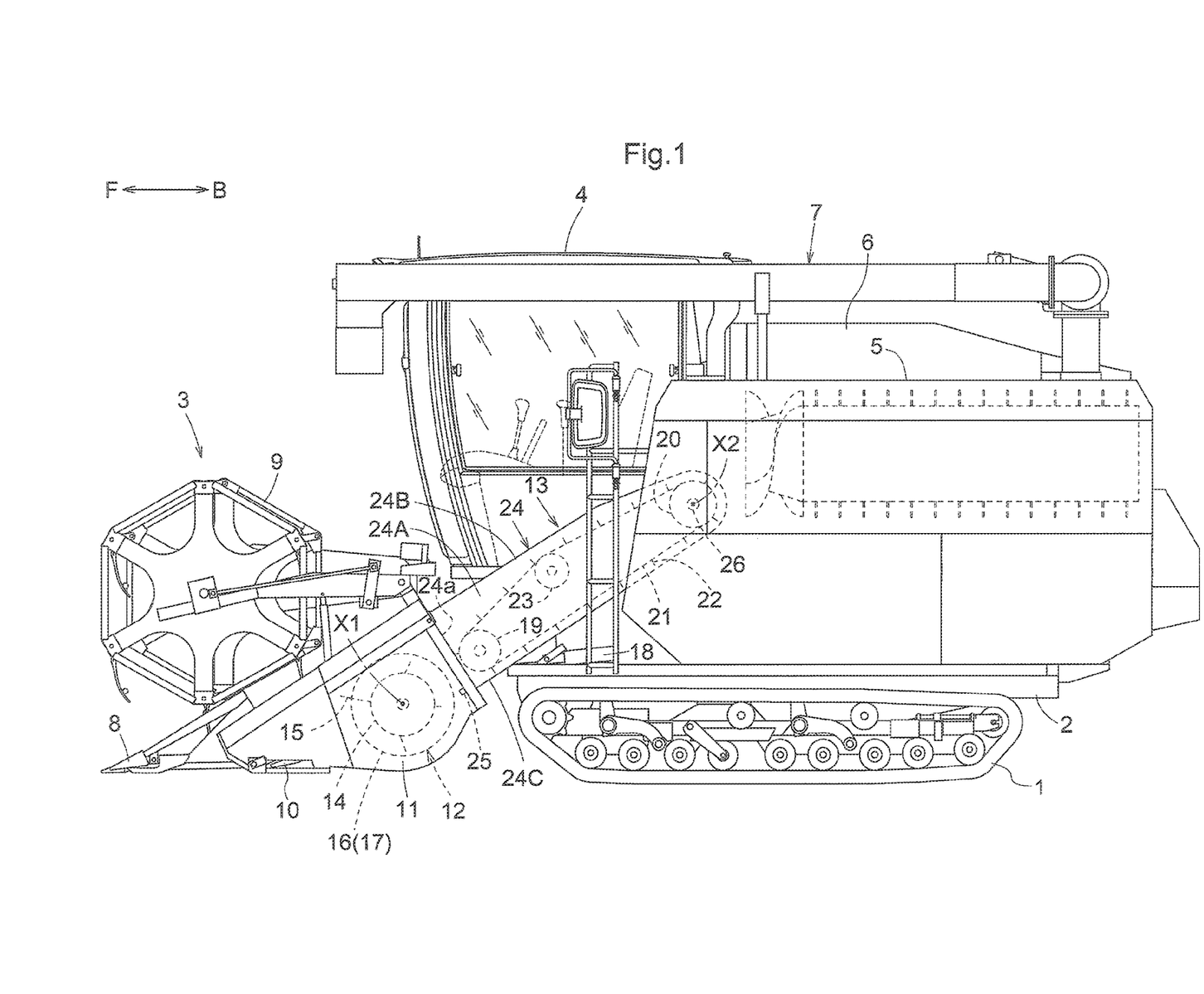
FIG. 1 is a left side view showing a combine harvester.
Figure 2:
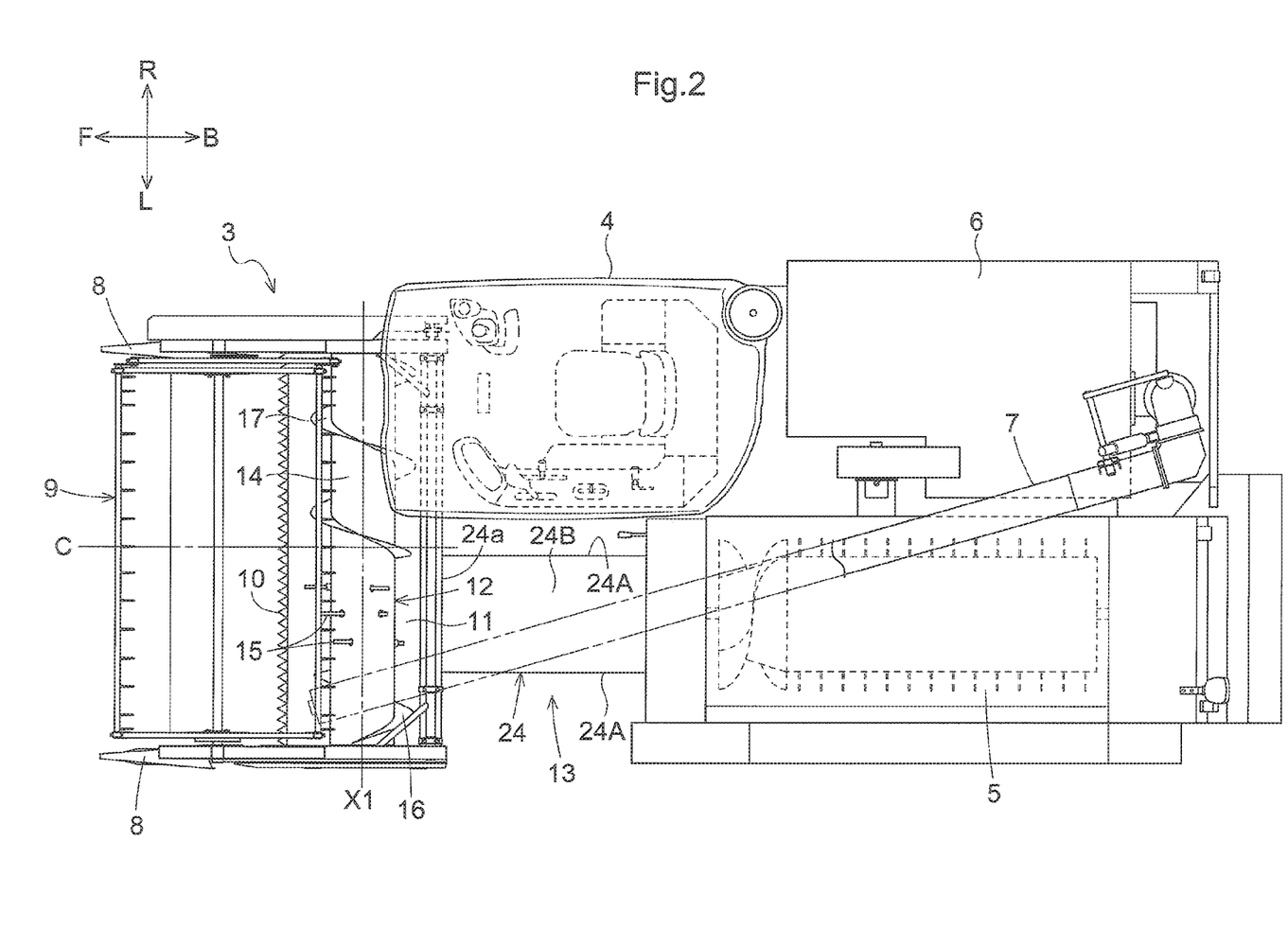
FIG. 2 is a plan view showing the combine harvester.

FIGS. 1 and 2 show a combine harvester (so-called a normal-type combine harvester) including a feeder 13 which will be described later in more detail. The combine harvester includes a crawler travel device 1, and a harvester body frame 2 supported by the crawler travel device 1. In the front portion of the harvester body frame 2, there is disposed a reaping unit 3 configured to be elevated and lowered, for cutting grain culms in the agricultural field and conveying the cut grain culms rearward relative to the harvester body. Rearward of the reaping unit 3, an operation cabin 4 is provided. Rearward of the operation cabin 4, a threshing device 5 that threshes grain culms and a grain tank 6 that stores the grains are disposed adjacent to each other in the right/left direction of the harvester body. The grain tank 6 includes an unloader 7 that discharges the grains from within the grain tank 6.

[Reaping Unit]

The reaping unit 3 includes a pair of right and left dividers 8, a rake-in reel 9, a reaping device 10, a harvest frame 11, a rake-in auger 12, and a feeder 13. The divider 8 divides the grain culms in the agricultural field into the grain culms to be reaped and the grain culms not to be reaped. The rake-in reel 9 rakes in the grain culms to be reaped out of the grain culms in the agricultural field. The reaping device 10 cuts the grain culms raked-in by the rake-in reel 9. The harvest frame 11 receives the grain culms cut by the reaping device 10. The rake-in auger 12 conveys the grain culms inside the harvest frame 11 in the right/left direction of the harvester body and rakes in the grain culms rearward relative to the harvester body. The feeder 13 is communicatively connected to a rear wall of the harvest frame 11, and conveys the grain culms raked in by the rake-in auger 12 rearward relative to the harvester body.

[Rake-in Auger]

The rake-in auger 12 is disposed inside the harvest frame 11 to be rotatable about a rotary axis X1 extending in the right/left direction of the harvester body. The rake-in auger 12 includes a drum 14, a plurality of rake-in fingers 15, a left screw wing 16 and a right screw wing 17.

The drum 14 is supported rotatably about the rotary axis X1 on both right and left side walls of the harvest frame 11. The rake-in fingers 15 are disposed at portions the drum 14 corresponding to the front of the feeder 13, and configured to protrude from and retreat to the periphery of the drum 14 in association with rotation of the drum 14. The left screw wing 16 is disposed at the left part relative to the rake-in fingers 15 on the periphery of the drum 14. The right screw wing 17 is disposed at the right part relative to the rake-in fingers 15 on the periphery of the drum 14. The length (conveying stroke) of right screw wing 17 is designed to be longer than the length of the left screw wing 16 in the right/left direction of the harvester body.

In operation of the rake-in auger 12, the grain culms inside the harvest frame 11 are conveyed by the left screw wing 16 and the right screw wing 17 rightward and leftward, respectively; and then the the grain culms are raked in rearward relative to the harvester body by the rake-in fingers 15.

[Feeder]

The feeder 13 is supported by the harvester body to be swingable around a swing axis X2 extending in the right/left direction relative to the harvester body. A hydraulic oil cylinder 18 extends between the feeder 13 and the harvester body frame 2. The feeder 13 is swung about the swing axis X2 by the hydraulic oil cylinder 18 for lifting and lowering the reaping unit 3. Also, the feeder 13 is disposed at a position offset to the left side relative to a center C of the harvest frame 11 in the right/left direction of the harvester body.

The feeder 13 includes a pair of front and rear rotating members 19, 20, a pair of right and left conveyor chains 21, a plurality of conveyor guides 22, a tension rotating member 23 and a feeder case 24. The conveyor chains 21 are wound around the rotating members 19, 20. A plurality of conveyor guides 22 extend between the pair of right and left conveyor chains 21 to engage the grain culms. The tension rotating member 23 provides the conveyor chains 21 with tension thereof. The feeder case 24 accommodates the pair of rotating members 19, 20, the pair of right and left conveyor chains 21, the plurality of conveyor guides 22 and the tension rotating member 23.

A grain culm feed port 24a is formed at the front edge of the feeder case 24 for introducing the grain culms that are fed from the inside of the harvest frame 11. A grain culm sensor 25 is disposed at the grain culm feed port 24a for detecting presence of the grain culms when the grain culms come into contact therewith. The feeder case 24 includes a pair of right and left side plates 24A, a top plate 24B and a bottom plate 24C.

A rear rotating member 20 is disposed at the rear edge of the feeder 13 and is configured to be rotatable about the rotary axis X2 extending in the right/left direction of the harvester body. The rear rotating member 20 includes a feeder drive shaft 26 to which power from the engine (not shown) is inputted.

Figure 3:
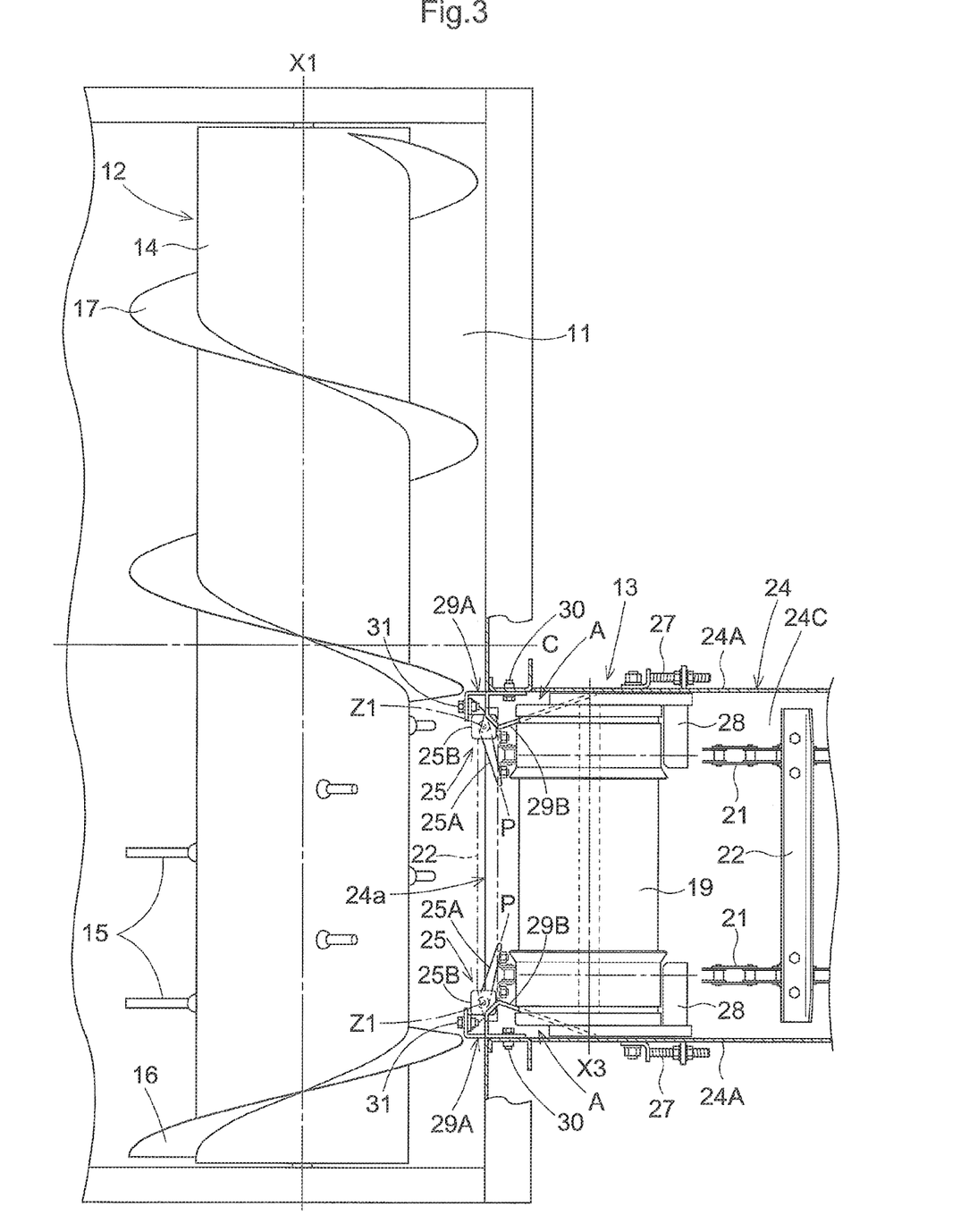
FIG. 3 is a plan view in section showing showing the vicinity of the front edge portion of a feeder.
Figure 4:
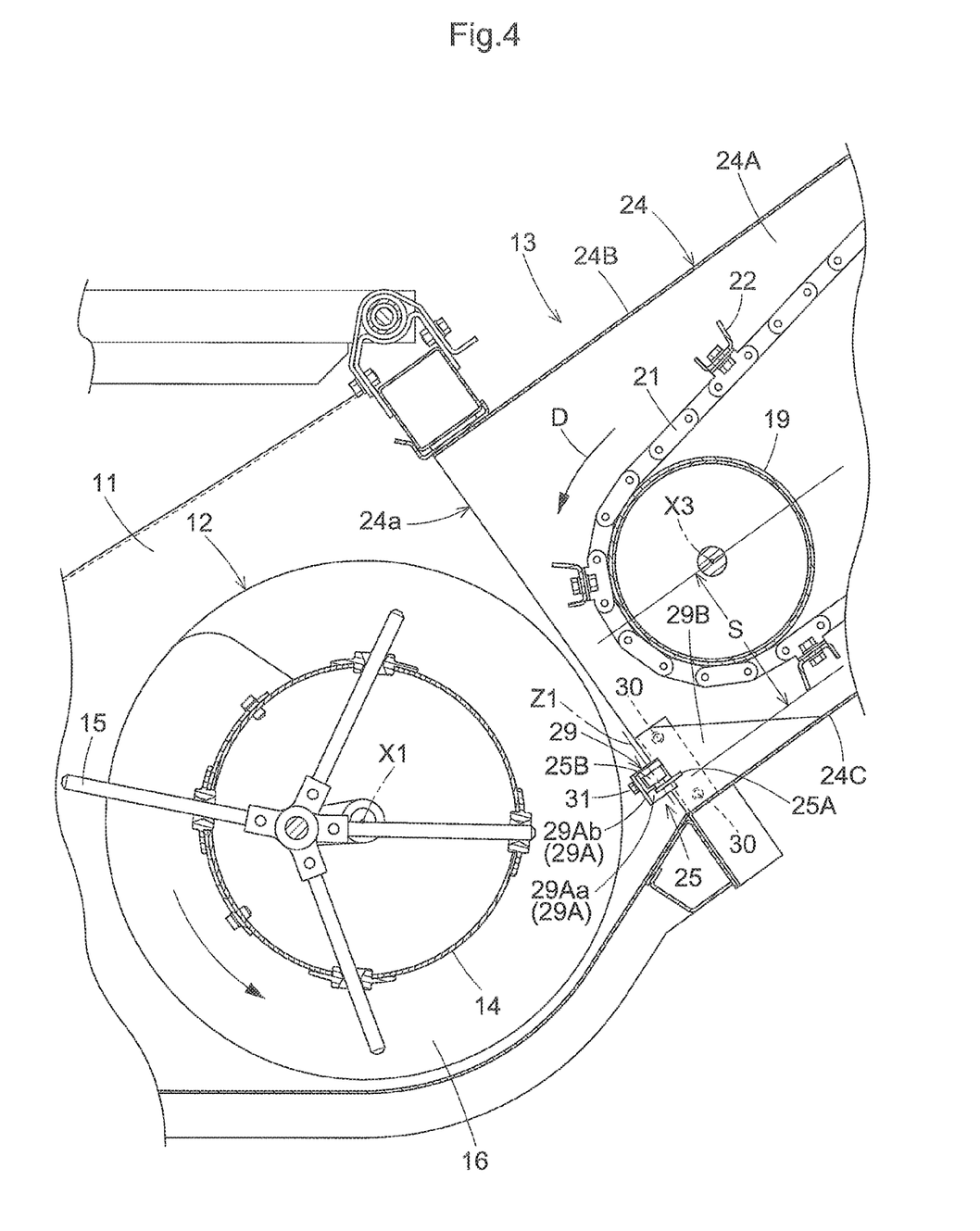
FIG. 4 is a left side view in section showing the vicinity of the front edge portion of the feeder.
Figure 5:
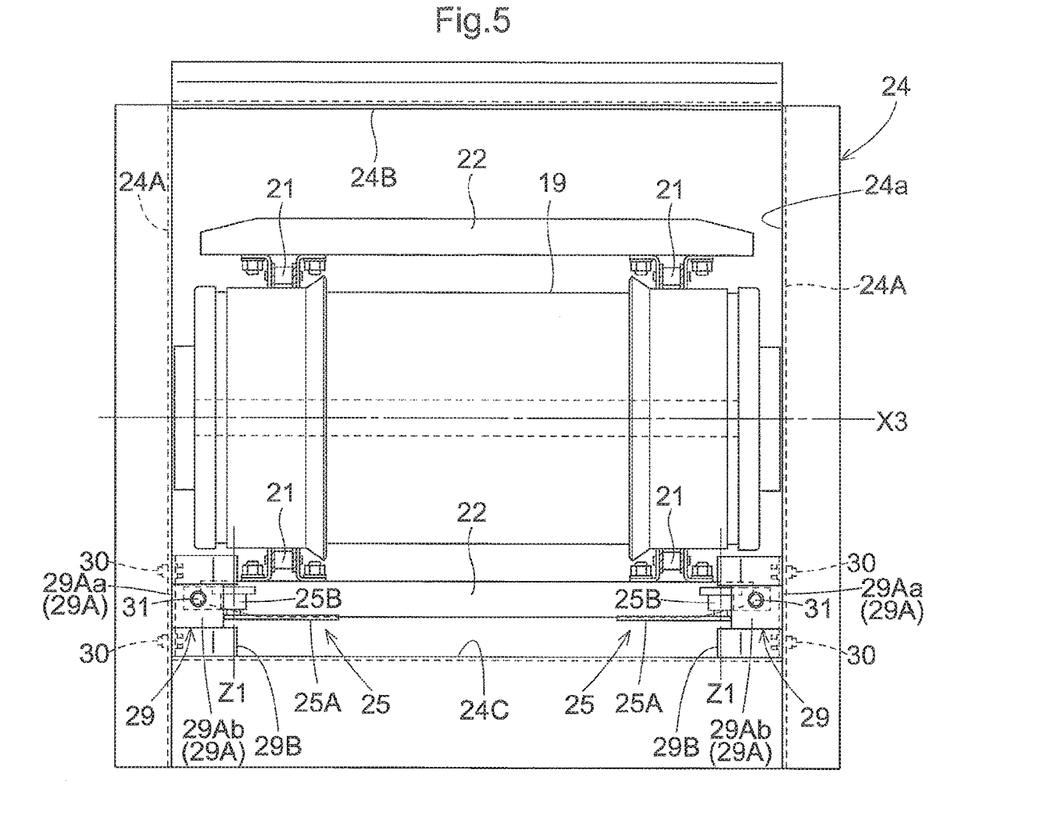
FIG. 5 is a front view showing the vicinity of the front edge portion of the feeder.
Figure 6:
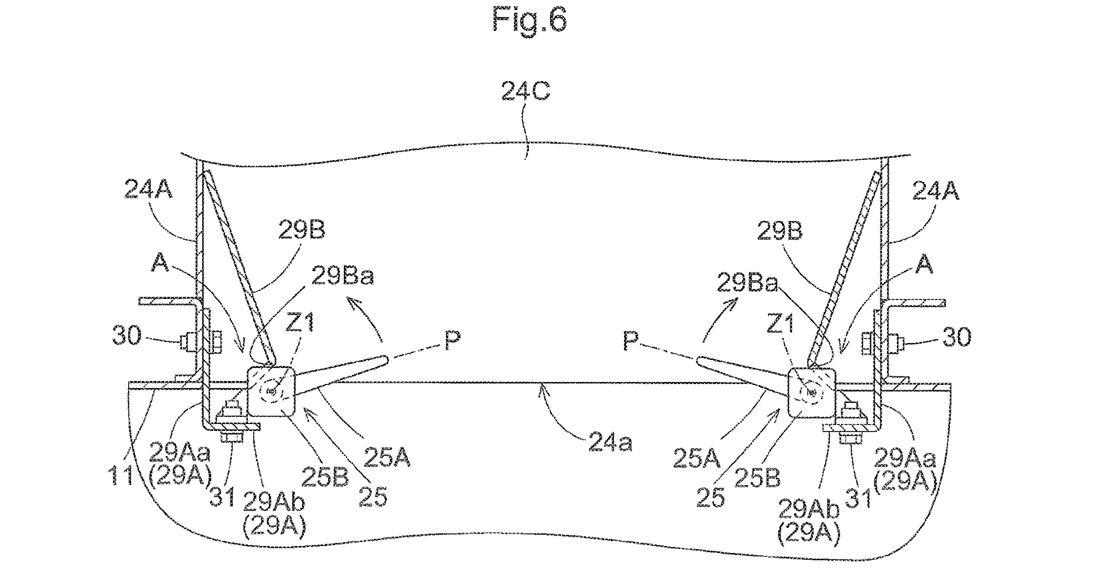
FIG. 6 is a plan view in section showing arrangement of grain culm sensors.

As shown in FIGS. 3 to 5, a front rotating member 19 is disposed at the front edge of the feeder 13 and configured to be rotatable about a rotary axis X3 extending in the right/left direction of the harvester body. The front rotating member 19 is configured so that the front/rear position (the front/rear position of the front rotating member 19) can be adjusted by a pair of right and left position adjustment mechanisms 27. A pair of scrapers 28 capable of removing substances adhering to the external periphery of the front rotating member 19 are provided.

In the feeder 13, when power from the engine is inputted to the feeder drive shaft 26, the rear rotating member 20 is rotationally driven, and the conveyor chains 21 rotates together with the conveyor guide 22 (in the direction of arrow D as shown in FIG. 4). The grain culms are thereby conveyed rearward relative to the harvester body along the lower path of the conveyor chains 21, between the lower path and the bottom plate 24C.

In addition, the feeder 13 includes a reverse rotation mechanism (not shown) that reverses the rotational direction of the feeder drive shaft 26. When the grain culms are clogged inside the feeder 13, the rotational direction of the feeder drive shaft 26 may be reversed by the reverse rotation mechanism to thereby rotate the conveying direction of the feeder 13 reversely forward relative to the harvester body (i.e. in a direction opposite to the arrow D shown in FIG. 4). As the grain culms thereby conveyed forward relative to the harvester body, the grain culms clogged inside the feeder 13 can be removed.

[Grain Culm Sensor]

As shown in FIGS. 3 to 6, a grain culm sensor 25 is disposed at the right and left edges of the grain culm feed port 24a. The grain culm sensor 25 is supported on the side plate 24A via a stay 29A so as to be positioned inside the harvest frame 11. The grain culm sensor 25 includes a detection member 25A and a main body 25B. The detection member 25A is a claw-shaped detection member that detects presence of the grain culms when the grain culms come in contact with the detection member 25A and swing this detection member 25A. The main body 25B is supported in a cantilever manner by the side plate 24A via the stay 29A and supports the detection member 25A such that the detection member 25A may swing around a swing axis Z1.

When the detection member 25A is in its initial position P (i.e. when the grain culms are not in contact therewith), the tip end thereof (the tip end of the detection member 25A) extends beyond the conveyor chains 21 to a position toward the center in the right/left direction of the feeder case 24. The detection member 25A is configured to swing along the bottom plate 24C around the swing axis Z1, that is, swing substantially in parallel with the bottom plate 24C. Incidentally, the state in which the detection member 25A is substantially in parallel with the bottom plate 24C includes a state in which the detection member 25A is slightly tilted relative to the bottom plate 24C, as well as a state in which the detection member 25A is parallel with the bottom plate 24C.

The detection member 25A is disposed at a position between the rotary axis X3 of the front rotating member 19 and the bottom edge of the conveyor guide 22 positioned at the lower path in the height direction of the grain culm feed port 24a. That is, the detection member 25A is disposed to be offset toward the conveyor guide 22 when this conveyor guide 22 comes on the lower path, within the range S of a space between the rotary axis X3 of the front rotating member 19 and the conveyor guide 22 positioned on the lower path.

The grain culm sensor 25 is configured as a sensor (volume sensor) that detects the presence of the grain culms according to the amount of the grain culms that is based on the swing angle of the detection member 25A. The grain culm sensor 25 is connected to a control device (not shown). The control device is configured to determine such that: when at least one of the right and left grain sensor 25 detects the presence of the grain culms, the control device determines that the harvester is in a reaping state; and when neither of the grain culm sensors 25 detects the presence of the grain culms, the control device determines that the harvester is in a non-reaping state.

[Stay]

The stay 29A includes a vertical portion (longitudinal portion) 29Aa and a lateral portion 29Ab. The vertical portion 29Aa extends along the side plate 24A in the front/rear direction of the harvester body. The lateral portion 29Ab extends, in the right/left direction of the harvester body, from the front edge of the vertical portion 29Aa toward the right/left center of the feeder case 24. The grain culm sensor 25 (the main body 25B) is fixed to the lateral portion 29Ab by a bolt 31 from the front side, with the grain culm sensor 25 being fitted to the back surface of the lateral portion 29Ab. In addition, an intrusion preventing portion 29B (corresponding to "intrusion preventing element" in the present invention) is formed integrally with the stay 29A. The stay 29A and the intrusion preventing portion 29B are integrally fixed to the side plate 24A by the bolt 30 from the lateral inner side.

[Intrusion Preventing Portion]

The intrusion preventing portion 29B extends between the side plate 24A and the rear edge of the main body 25B. The intrusion preventing portion 29B is configured to prevent intrusion of the grain culms into the area at the back of the main body 25B between the main body 25B and the side plate 24A (referred to as "back area" hereinafter). At the intrusion preventing portion 29B, a notched part 29Ba is formed to allow the grain culm sensor 25 (the main body 25B) to extend through the the notched part 29Ba. The intrusion preventing portion 29B is overlapped with the front rotating member 19 as seen in the direction of the swing axis Z1 (in the vertical direction relative to the bottom plate 24C). The rear end of the intrusion preventing portion 29B is connected to the side plate 24A; and the lower end of the intrusion preventing portion 29B is connected to the bottom plate 24C. Thus, the grain culms are prevented from intruding into the back area A from the space between the rear end of the intrusion preventing portion 29B and the side plate 24A, or the space between the intrusion preventing portion 29B and the bottom plate 24C.

The intrusion preventing portion 29B defines a lateral portion, a front oblique portion and a rear oblique portion. The lateral portion of the intrusion preventing portion 29B extends along the grain culm feed port 24a in the right/left direction of the harvester body. The front oblique portion of the intrusion preventing portion 29B extends diagonally rearward from one edge of the lateral portion adjacent the right/left center of the feeder case 24, toward the right/left center of the feeder case 24 at its tip end extension thereof. The rear oblique portion of the intrusion preventing portion 29B extends diagonally rearward from the rear end of the front oblique portion, toward the side plate 24A at its tip end extension thereof. With such configuration, on the front oblique portion of the intrusion preventing portion 29B provided on each of the right and left sides, the grain culms are received in a wide range in the right/left direction of the harvester body; and on the rear oblique portion of the intrusion preventing portion 29B provided on each of the right and left sides, the grain culms are guided rearward relative to the harvester body in a wide range in the right/left direction of the harvester body.

[Mode of Detecting Grain Culms by Grain Culm Sensor]

By the rake-in auger 12, the grain culms inside the harvest frame 11 are raked in rearward relative to the harvester body along the bottom plate of the harvest frame 11, and fed toward the grain culm feed port 24a. Then, when the grain culms at the grain culm feed port 24a come in contact with the detection member 25A from the front side, the detection member 25A swings rearward from its initial position P around the swing axis Z1. Thus, the presence of the grain culms is detected by the grain culm sensor 25. In addition, even if the grain culms is to go though the space under the grain culm sensor 25 to enter the back area A, the intrusion preventing portion 29B prevents the grain culms from intruding into the back area A. Thus, according to the instant embodiment, since the grain culm sensor 25 is disposed at the grain culm feed port 24a toward which the mass of grain culms raked up by the rake-in auger 12 are rushed, the grain culms are brought into contact with the grain culm sensor 25 with enhanced possibility and the detection precision of the grain culm sensor 25 is improved.

[Other Embodiments]

Figure 7:
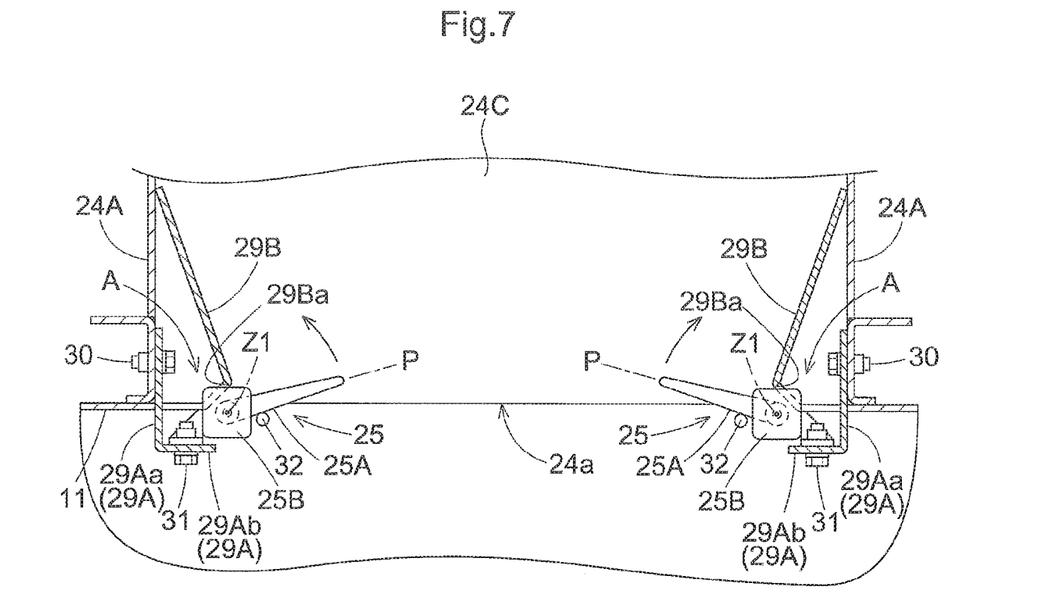
FIG. 7 is a plan view in section showing grain culm sensors according to a first other embodiment of the invention.

(1) As shown in FIG. 7, there may be provided a restricting member 32 that is configured to restrict forward swinging of the detection member 25A from the initial position P around the swing axis Z1. Such a restricting member 32 may be configured by a round rod member, for example.

According to the structure, when the rotational direction of the feeder 13 is reversed by the reverse rotation mechanism toward the front of the harvester body, even if the grain culms conveyed toward the front of the harvester body come in contact with the detection member 25A from the rear side, the swinging of the detection member 25A forward from the initial position P around the swing axis Z1 is restricted by the restricting member 32 by the contact of the restricting member 32 with the detection member 25A. Thus, even if the grain culms come into contact with the detection member 25A from the rear side, the detection member 25A is not overloaded, thus preventing the detection member 25A from being damaged.

Figure 8:
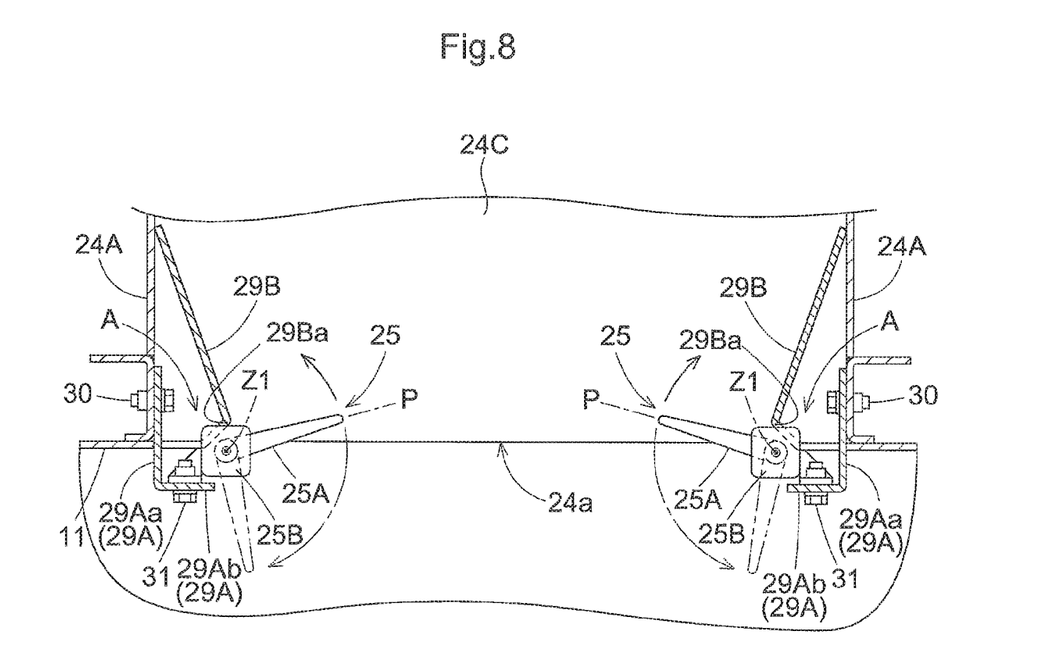
FIG. 8 is a plan view in section showing grain culm sensors according to a second other embodiment of the invention.

Alternatively, as shown in FIG. 8, the grain culm sensor 25 may be configured to swing forward from the initial position P around the swing axis Z1.

According to this configuration, when the conveying direction of the feeder 13 is reversed by the reverse rotation mechanism toward the front of the harvester body, even if the grain culms conveyed toward the front of the harvester body come in contact with the detection member 25A from the rear side, the swinging of the detection member 25A forward from the initial position P around the swing axis Z1 is allowed, thus preventing the detection member 25A from being overloaded, and the detection member 25A from being damaged.

(2) In the foregoing embodiment, the grain culm sensor 25 is constituted by a volume sensor. Alternatively, the grain culm sensor 25 may be constituted by an ON/OFF sensor as well, that is configured to detect presence of the grain culms based on detection whether the detection member 25A swings to a certain angle or not. In addition, the grain culm sensor 25 is constituted by a claw-type sensor, but may be any type of contact sensor, and not necessarily a claw-type sensor.

(3) In the foregoing embodiment, the grain culm sensor 25 is disposed at the right and left edges of the grain culm feed port 24a, but may also be disposed only on the right edge of the grain culm feed port 24a, or only on the left edge of the grain culm feed port 24a.

(4) In the foregoing embodiment, the detection member 25A is disposed at a position between the rotary axis X3 of the front rotating member 19 and the lower edge of the conveyor guide 22 positioned on the lower path in the height direction of the grain culm feed port 24a, but may also be disposed at a position lower than the lower edge of the conveyor guide 22 that is positioned at the lower path.

(5) In the foregoing embodiment, the feeder 13 is disposed at a position offset to the left side relative to/from the center C of the harvest frame 11 in the right/left direction of the harvester body, but the invention is not limited thereto. For example, the feeder 13 may be disposed at a position offset to the right side relative to the center C of the harvest frame 11 in the right/left direction of the harvester body, or the feeder may be disposed at the center of the harvest frame 11.

(6) In the foregoing embodiment, the intrusion preventing portion 29B is formed integrally with the stay 29A, but the intrusion preventing portion 29B may also be configured separately from the stay 29A. Also, the shape of the intrusion preventing element 29B is not limited to the shape that is described in the foregoing embodiment. Further, the intrusion preventing element 29B may be omitted.

(7) In the foregoing embodiment, the stay 29A and the intrusion preventing portion 29B are fixed integrally by the bolt 30, but may be fixed by welding, or the stay 29A and the intrusion preventing portion 29B may be fixed individually.

(8) When the harvester body is to be travelled automatically, the reaping width and the reaping position can be confirmed based on the detection state of the grain culm sensors 25 on the right and left sides. For example, if the grain culm sensors 25 on both the right and left sides detect the presence of the grain culms, it means that the grain culms are reaped along the whole width of the reaping unit 3; whereas, if the grain culm sensor 25 on only the left side detects the presence of the grain culms, it means that the grain culms are reaped on only the left part of the reaping unit 3; and if the grain culm sensor 25 on only the right side detects the presence of the grain culms, it means that the grain culms are reaped on only the right part of the reaping unit 3.

INDUSTRIAL APPLICABILITY

The invention has its utility in a wheel type combine harvester, as well as a crawler type combine harvester as described above.

DESCRIPTION OF REFERENCE SIGNS

10: Reaping device
11: Harvest frame
12: Rake-in auger
13: Feeder
19: Front rotating member
20: Rear rotating member
21: Conveyor chain
22: Conveyor guide
24A: Side plate
24C: Bottom plate
24a: Grain culm feed port
25: Grain culm sensor
25A: Detection member
25B: Main body
29C: Intrusion preventing portion (Intrusion preventing element)
A: Back area (Area at the back of the main body between the main body and the side plate)
C: Center of the harvest frame
X1: Rotary axis (Rotary axis of the rake-in auger)
X2: Rotary axis (Rotary axis of the rear rotating member)
X3: Rotary axis (Rotary axis of the front rotating member)

What is claimed is:

1. A combine harvester comprising:
a reaping device that cuts grain culms that are in an agricultural field;
a harvest frame that receives the grain culms cut by the reaping device;
a rake-in auger that is disposed within the harvest frame to be rotatable about a rotary axis extending in a right/left direction of a harvester body, the rake-in auger conveying the grain culms inside the harvest frame in the right/left direction of the harvester body to rake in the grain culms toward a rear of the harvester body; and
a feeder that is communicatively connected to a rear wall of the harvest frame for conveying the grain culms raked in by the rake-in auger toward the rear of the harvester body, and
a grain culm sensor that is disposed at a grain culm feed port in the feeder for detecting a presence of the grain culms when the grain culms come into contact with the grain culm sensor,
wherein the grain culm sensor includes a claw-shaped detection member that swings when the conveyed grain culms come into contact with the grain culm sensor, to detect the presence of the grain culms, and
the detection member swings along a bottom plate of the feeder.

2. The combine harvester according to claim 1, wherein
the feeder is disposed to be offset to one side relative to a center of the harvest frame in the right/left direction of the harvester body, and
the grain culm sensor is disposed at an edge of the grain culm feed port on the other side in the right/left direction of the harvester body.

3. The combine harvester according to claim 1, wherein the grain culm sensor is disposed at one side edge and at the other side edge of the grain culm feed port in the right/left direction of the harvester body.

4. The combine harvester according to claim 1, wherein the feeder includes a pair of front and rear rotating members rotatable about the rotary axis extending in the right/left direction of the harvester body, a pair of right and left conveyor chains that are wound around the pair of front and rear rotating members, and a plurality of conveyor guides that extend between the pair of right and left conveyor chains to engage the grain culms,
the feeder is configured to convey the grain culms rearward relative to the harvester body along a lower path of the conveyor chains, and
the detection member is disposed at a position between the rotary axis of the front rotating member and a bottom edge of the conveyor guide positioned on the lower path, in a height direction of the grain culm feed port.

5. The combine harvester according to claim 1, wherein the grain culm sensor includes a main body that is supported in a cantilever manner by a side plate of the feeder and that supports the detection member, and
an intrusion preventing element extends between the side plate and the rear edge of the main body to prevent intrusion of the grain culms into an area behind the main body between the main body and the side plate.

* * * * *